May 13, 1930.  L. DEL RICCIO  1,758,689
HEAT PROTECTION MEANS FOR MOTION PICTURE PROJECTORS
Filed April 19, 1927
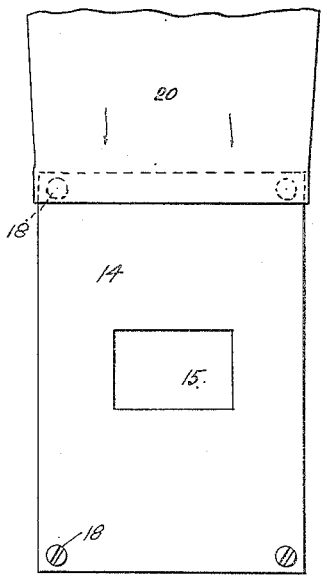
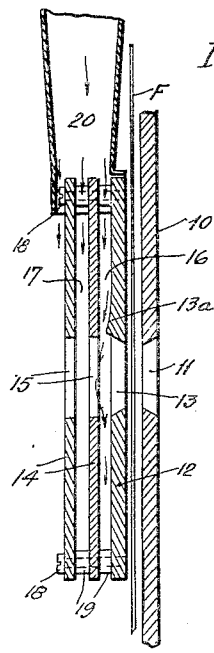
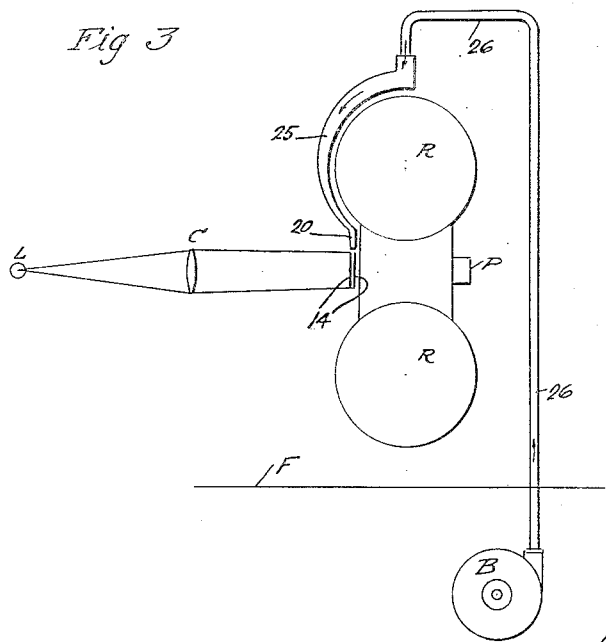
Inventor.
Lorenzo del Riccio.
Attorney.

Patented May 13, 1930

1,758,689

UNITED STATES PATENT OFFICE

LORENZO DEL RICCIO, OF NEW YORK, N. Y., ASSIGNOR TO PARAMOUNT FAMOUS LASKY CORPORATION, OF LOS ANGELES, CALIFORNIA, A CORPORATION OF NEW YORK

HEAT-PROTECTION MEANS FOR MOTION-PICTURE PROJECTORS

Application filed April 19, 1927. Serial No. 184,855.

This invention relates to means for protecting motion picture film from the intense heat to which it is usually subjected in a projector. The intensity of illumination demanded in present day picture shows, together with the large size of the screen, require that a very intense illumination be thrown upon the film itself. Unless a film is protected in some manner, the heat accompanying this intense illumination is very likely to heat the film to the ignition point, particularly if the film happens for any reason to be stopped. Certain means have heretofore been used for protecting film against this excessive heat. Water boxes have been most commonly used, but have involved certain inconveniences and must be provided with a circulation of distilled water.

The object of this invention is to provide a simple and effective means for protecting the film against excessive heat, and at the same time to provide an arrangement such that should the film ignite, flame and combustion are controlled and retarded so that the flame does not immediately or explosively spread to adjacent parts of the film.

I accomplish this object by making certain provisions for an air blast or air cooling stream behind the film, at the same time making provision to protect the adjacent metal parts of the projector apparatus from the heat rays. By doing this I find that I keep the film normally at a temperature well below its ignition point or below the emulsion melting point, and at the same time the air blast cools any flame which may start by reason of film stoppage and keeps the flame within control.

The following description of a preferred and specific form and arrangement illustrative of the invention will best serve for an understanding of the invention itself; and for that purpose I refer to the accompanying drawings, in which:

Fig. 1 is a vertical longitudinal section through the film gate part of a projection apparatus, showing my heat protective means in place;

Fig. 2 is a rear elevation of the parts shown in Fig. 1; and

Fig. 3 is a diagrammatic elevation illustrating the general arrangement of parts in accordance with my invention.

In Fig. 3 the protective apparatus is shown diagrammatically applied to a projector with the reel boxes at R, projection lens at P, the source of light at L and a condenser lens at C. In Fig. 1 the aperture plate is illustrated at 10, having the usual aperture 11 and behind that is located the usual film gate 12 with its aperture 13, the film being shown at F traveling between the aperture plate and film gate. Behind the film gate I provide one or more spaced heat resistant and insulating plates 14 each with an aperture 15. Asbestos is a good material for the plates. The foremost one of these plates will be spaced from the film gate to afford a thin space or channel 16 through which an air stream may flow, and likewise the rearward plate or plates will be spaced from the forward plate to provide a similar air channel 17. The plate or plates may be conveniently mounted on the apparatus, as for instance mounted directly upon the film gate, by means of bolts or cap screws 18 and spacers 19. The plates 14 are shown diagrammatically in Fig. 3. They are made large enough to cover substantially the whole area on which the beam of light and heat from condenser C falls, so that they protect the metal parts of the apparatus from the direct effects of the heat which would otherwise be radiated directly upon those metal parts. It is important that those metal parts be thus protected as the metal parts otherwise conduct heat to the film and heat it quickly to a high temperature.

Above the spaced protective plates 14 I place an air delivery nozzle 20 through which air is delivered downwardly in a blast to the upper edges of plates 14 and to the upper ends of the channels between them. Nozzle 20 is wide enough that it not only delivers the air blast to the channels 16 and 17 but also delivers the air blast to the back face of the rearmost protective plate 14; so that if, for instance, two plates 14 are used, the air blast travels downwardly in three thin streams, between the film gate and the forward plate 14, between the two plates 14, and behind the rearward plate 14. These air streams have the effect of keeping the heat resistant plates cool, of keeping the film gate entirely cool and also of carrying off heat from the beam which falls directly on the film. The air blasts cross the openings 13 and 15 and in thus crossing the light beam carry off a considerable portion of the heat directly from that beam. The air blast thus has two functions, the function of keeping the metal parts and the protective plates cool and also the function of directly carrying heat away from the beam of light and heat. The protective plates 14 also have two functions: that of protecting the metal parts of the apparatus from direct heat effects and also that of dividing the air blast into thin streams which most readily take up the heat from the metal parts and also from the plates themselves.

The arrangement for getting an air blast to nozzle 20 may be made in a variety of manners, but I indicate in Fig. 3 a suitable arrangement. Here a tapering curved feeder tube 25 leads around the upper reel box R. To the upper end of this tapering tube 25 there connects a conduit 26 which may conveniently lead from a blower B located below floor F. This general arrangement may be varied to suit any particular circumstances or to suit the arrangement of a projector in a projection room; and the air blast may be forced upwardly between the plates as well as downwardly. Conduit 26 may preferably be of some considerable size so that a low pressure blower may be used, but the feeder tube 25 is preferably tapered throughout its length and leads to the tapered nozzle 20; so that the whole volume of air is then delivered in a small stream of high velocity to the upper edges of the protective plates and to the spaces between and surrounding them.

To preclude any possibility of the air blast developing pressure on the rear face of the film at aperture 13, there may be a small deflector 13ª on the rear face of the film gate above the aperture, to deflect the air blast slightly to the rear as it crosses the aperture.

I claim:

1. In combination with the aperture plate and film confining gate of a projector, heat protective means embodying an apertured plate of heat resistant material spaced behind the gate, and means to direct an air stream along the faces of the plate.

2. In combination with the aperture plate and film confining gate of a projector, heat protective means embodying an apertured plate spaced behind the gate, and means to direct an air current between the plate and the gate and along the faces of the plate.

3. In combination with the aperture plate and film confining gate of a projector, heat protective means embodying an apertured plate spaced behind the gate, covering the parts of the gate and aperture plate surrounding the aperture, and means to direct an air current between the plate and the gate and along the faces of the plate.

4. In combination with the aperture plate and film confining gate of a projector, heat protective means embodying a plurality of apertured plates of heat resistant material spaced behind the gate and spaced one behind another to afford air channels behind the gate and between the plates, said plates being substantially parallel to the aperture plate and the gate and extending laterally to all sides of the aperture to protect the parts of the gate and aperture plate surrounding the aperture, and means to direct an air stream through said air channels and across the apertures.

5. In combination with the aperture plate and film confining gate of a projector, heat protective means embodying a plurality of apertured plates of heat resistant material spaced behind the gate and spaced one behind another to afford air channels behind the gate and between the plates, said plates being substantially parallel to the aperture plate and the gate and extending laterally to all sides of the aperture to protect the parts of the gate and aperture plate surrounding the aperture, and means to direct an air stream through said air channels and along the rear face of the rearmost plate and across the apertures.

6. In combination with the aperture plate and film confining gate of a projector, heat protective means embodying a plurality of apertured plates of heat resistant and non-conductive material spaced behind the gate and spaced one behind another to afford thin air channels behind the gate and between the plates, said plates being substantially parallel to the aperture plate and the gate and extending laterally to all sides of the aperture to protect the parts of the gate and aperture plate surrounding the aperture, and means to direct an air stream through said air channels and along the rear face of the rearmost plate and across the apertures.

7. In combination with the aperture plate and film confining gate of a projector, heat protective means embodying an apertured plate of heat resistant material spaced behind the gate, means to direct an air stream along the faces of the plate, and a deflector on the rear face of the film gate to deflect the air stream away from the film at the aperture.

8. In combination with the aperture plate and film confining gate of a projector, heat protective means embodying an apertured plate of heat resistant material spaced behind the gate, covering the parts of the gate and aperture plate surrounding the aperture, and means to direct an air current between the plate and the gate, and a deflector on the rear face of the film gate to deflect the air stream away from the film at the aperture.

9. In combination with the aperture plate and film confining gate of a projector, heat protective means embodying a plurality of apertured plates spaced behind the gate and spaced behind one another to afford air channels behind the gate and between the plates, said plates being substantially parallel to the aperture plate and the gate and extending laterally to all sides of the aperture to protect the parts of the gate and aperture plate surrounding the aperture, and means to project an air stream through said air channels and across the apertures.

10. The combination with the aperture plate and film confining gate of a projector, heat protective means embodying a plurality of apertured plates spaced behind the gate and spaced one behind another to afford air channels behind the gate and between the plates, said plates being substantially parallel to the aperture plate and the gate and extending laterally to all sides of the aperture to protect the parts of the gate and aperture plate surrounding the aperture, and means to direct an air stream through said air channels and along the rear face of the rearmost plate and across the apertures.

In witness that I claim the foregoing I have hereunto subscribed my name this 25th day of March, 1927.

LORENZO DEL RICCIO.